United States Patent
Piefer et al.

(10) Patent No.: US 12,157,930 B2
(45) Date of Patent: Dec. 3, 2024

(54) SEPARATION OF RARE EARTH ELEMENTS

(71) Applicant: SHINE Technologies, LLC, Janesville, WI (US)

(72) Inventors: Gregory Piefer, Janesville, WI (US); Eric Van Abel, Janesville, WI (US); Richard Sisson, Janesville, WI (US)

(73) Assignee: SHINE Technologies, LLC, Janesville, WI (US)

( * ) Notice: Subject to any disclaimer, the term of this patent is extended or adjusted under 35 U.S.C. 154(b) by 435 days.

(21) Appl. No.: 17/778,257

(22) PCT Filed: Nov. 19, 2020

(86) PCT No.: PCT/US2020/061332
§ 371 (c)(1),
(2) Date: May 19, 2022

(87) PCT Pub. No.: WO2021/102167
PCT Pub. Date: May 27, 2021

(65) Prior Publication Data
US 2023/0002855 A1    Jan. 5, 2023

Related U.S. Application Data

(60) Provisional application No. 62/938,103, filed on Nov. 20, 2019.

(51) Int. Cl.
*C22B 59/00* (2006.01)
*B01D 7/00* (2006.01)
(Continued)

(52) U.S. Cl.
CPC ............... *C22B 59/00* (2013.01); *B01D 7/00* (2013.01); *C22B 3/205* (2013.01); *C22B 9/02* (2013.01);
(Continued)

(58) Field of Classification Search
CPC   C22B 59/00; C22B 3/205; C22B 9/02; C22B 9/04; B01D 7/00; G21G 2001/0094; Y02P 10/20
See application file for complete search history.

(56) References Cited

U.S. PATENT DOCUMENTS

| | | |
|---|---|---|
| 3,558,440 A | 1/1971 | Harris et al. |
| 7,244,403 B1 | 7/2007 | Maloney et al. |

(Continued)

FOREIGN PATENT DOCUMENTS

| | | |
|---|---|---|
| CN | 101835914 A | 9/2010 |
| CN | 102230089 A | 11/2011 |

(Continued)

OTHER PUBLICATIONS

National Library of France, Gallica.bnf.fr/ BnF. "Weekly Minutes of the Sessions of the Academie des sciences/published by the perpetual Secretaries" Session of Jun. 17, 1957.
(Continued)

*Primary Examiner* — Adil A. Siddiqui
(74) *Attorney, Agent, or Firm* — Dinsmore & Shohl LLP

(57) ABSTRACT

A method for purifying lutetium includes providing a solid composition comprising ytterbium and lutetium and subliming or distilling ytterbium from the solid composition at a temperature of about 1196° C. to about 3000° C. to leave a lutetium composition comprising a higher weight percentage of lutetium than was present in the solid composition.

43 Claims, 2 Drawing Sheets

(51) Int. Cl.
  *C22B 3/20* (2006.01)
  *C22B 9/02* (2006.01)
  *C22B 9/04* (2006.01)
  *G21G 1/00* (2006.01)
(52) U.S. Cl.
  CPC ....... *C22B 9/04* (2013.01); *G21G 2001/0094* (2013.01); *Y02P 10/20* (2015.11)

(56) References Cited

U.S. PATENT DOCUMENTS

| | | | |
|---|---|---|---|
| 9,816,156 | B2 | 11/2017 | Marx et al. |
| 2007/0297554 | A1 | 12/2007 | Lavie et al. |
| 2010/0260640 | A1 | 10/2010 | Shindo et al. |

FOREIGN PATENT DOCUMENTS

| | | |
|---|---|---|
| CN | 102719685 A | 10/2012 |
| CN | 103718250 A | 4/2014 |
| CN | 109082542 A | 12/2018 |
| CN | 111440947 B | 2/2022 |
| RU | 2704005 C1 | 10/2019 |
| WO | 2019106182 A1 | 6/2019 |
| WO | 2021202914 A1 | 10/2021 |

OTHER PUBLICATIONS

Dash et al. Indirect Production of No Carrier Added (NCA) 177Lu from Irradiation of Enriched 176Yb: Options for Ytterbium/Lutetium Separation, Current Radiopharmaceuticals, vol. 8, No. 2, 2015. pp. 107-118.

International Search Report and Written Opinion for application PCT/US2020/061332 mail date Mar. 11, 2021 (11 pages).

B. J. Beaudry & F. H. Spedding: "The Gd-Yb and Lu-Yb phase systems", Metallurgical and Materials Transactions B, vol. 5.7, No. 7, Nov. 30, 1973 (Nov. 30, 1973), New York, pp. 1631-1636, XP009529139, ISSN: 1543-1916, DOI: 10.1007/BF02646335.

GSCHNEIDER "The Application of Vacuum Metallurgy in the Purification of Rare-Earth Metals" No. IS-1195; CONF-650617-3. Ames Lab., Iowa State Univ. of Science and Tech., 1965, https://www.osti.gov/servlets/purl/4578286.

Chinese Patent Office Action for Application No. 202080080878.4 dated Sep. 7, 2023 (17 pages with English Translation).

Zhuxian Qiu, "Nonferrous Metallurgy for Higher Education", p. 341, Metallurgical Industry Press, published on May 31, 1988.

Extended European Search Report for Application No. 20890926.7 dated Nov. 16, 2023 (9 pages).

Canadian Patent Office Action for Application No. 3,158,069 dated Oct. 4, 2023 (4 pages).

Chinese Patent Office Action for Application No. 202080080878.4 dated Apr. 11, 2024 (18 pages with English Translation).

Zuzana Dvorakova, "Production and chemical processing of Lu for nuclear medicine at the Munich research reactor FRM-II" Institut fur Radiochemie der Technischen Universitat Munchen, dissertation submitted Aug. 13, 2007.

Watanabe et al. "Production of highly purified No. carrier-added 177Lu for radioimmunotherapy", J Radioanal Nucl Chem (2015) 303, pp. 935-940.

GUPTA. "Extractive Metallurgy of Rare Earths" 1-484. CRC Press. Web, Https://vector.umd.edu/images/links/Extractive_Metallurgy_of_Rare_Earths_Gupta.pdf. 2005; p. 22 paragraph 3, p. 28 paragraph 4, p. 29 paragraph 2, table 5.8.

Wu, "Rare Earth Metallurgy", Central South University Press, Sep. 30, 2001, p. 291.

Canadian Office Action dated Aug. 27, 2024, pertaining to CA Patent Application No. 3, 158,069, 4 pgs.

Chinese Office Action dated Aug. 29, 2024, pertaining to CN Patent Application No. 2020800808784, 16 pgs.

SEPARATION OF RARE EARTH ELEMENTS

CROSS-REFERENCE TO RELATED APPLICATIONS

This application is a national phase entry of PCT/US2020/061332 filed on Nov. 19, 2020, which claims the benefit of and priority to U.S. Provisional Application No. 62/938,103, filed on Nov. 20, 2019, the contents of which are incorporated herein by reference in their entirety.

FIELD

The present technology is generally related to the separation of rare earth elements and their purification. More particularly, it is related to the isolation and purification of lutetium from an irradiation target that includes other rare earth metals, such as ytterbium.

SUMMARY

In one aspect, a method for purifying lutetium is provided, the method includes providing a solid composition having ytterbium and lutetium therein, and subliming or distilling the ytterbium from the solid composition at a reduced pressure and at a temperature of about 400° C. to about 3000° C. to leave a lutetium composition comprising a higher weight percentage of lutetium than was present in the solid composition (i.e. a lutetium-enriched composition or sample). In some embodiments, the temperature may be about 450° C. to about 1500° C. In any of the above embodiments, the reduced pressure may be about $1\times10^{-8}$ to about 750 torr. In any of the above embodiments, the subliming or distilling may be conducted at a rate of about 1 minutes/gram to about 10 hours/gram of solid composition. In any of the above embodiments, the solid composition may include Yb-176 and Lu-177.

In another aspect, a method includes subjecting a sample comprising Yb-176 and Lu-177 to sublimation, distillation, or a combination thereof to remove at least a portion of the Yb-176 from the sample to form a Lu-177 enriched sample.

DETAILED DESCRIPTION

Figure 1:
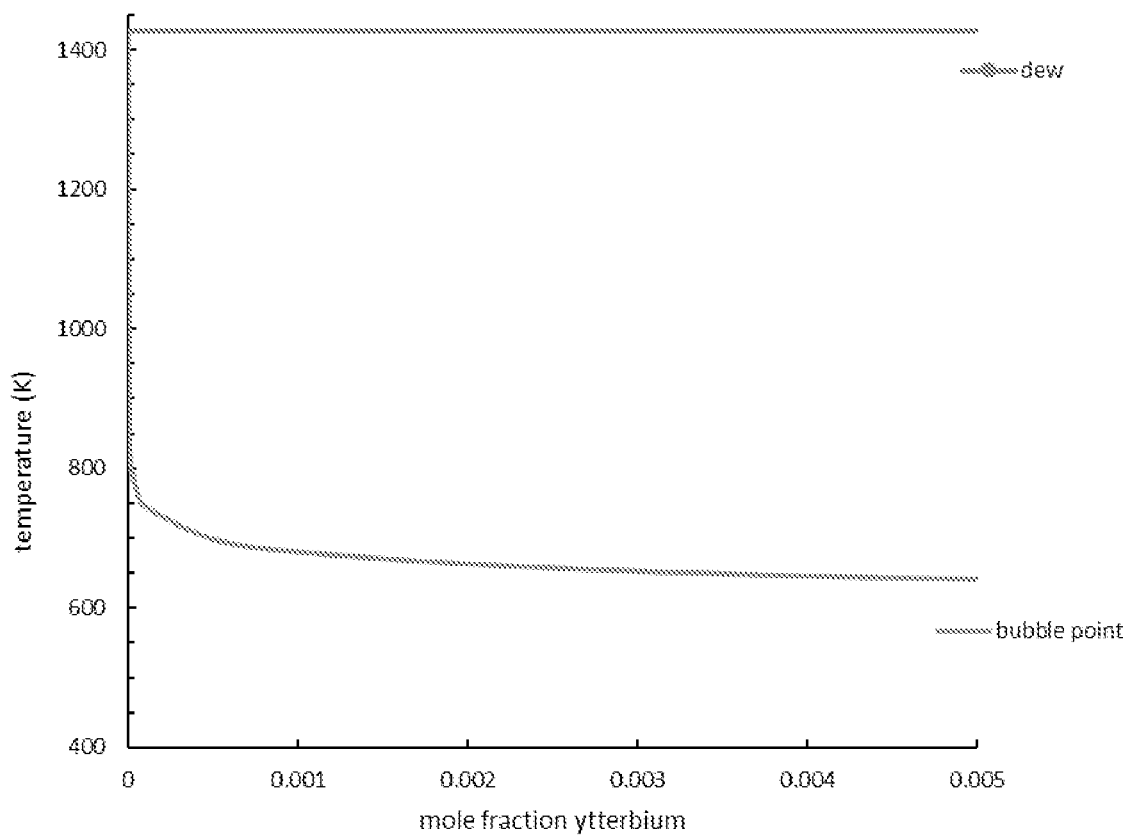
FIG. 1 is a T-x-y diagram for lutetium and ytterbium at a constant pressure of 1 µTorr.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Lutetium-177 (Lu-177) is used in the treatment of neuro endocrine tumors, prostate, breast, renal, pancreatic, and other cancers. In the coming years, approximately 70,000 patients per year will need no carrier added Lu-177 during their medical treatments. Lu-177 is useful for many medical applications, because during decay it emits a low energy beta particle that is suitable for treating tumors. It also emits two gamma rays that can be used for diagnostic testing. Isotopes with both treatment and diagnostic characteristics are termed "theranostic." Not only is Lu-177 theranostic, it also has a 6.65-day half-life, which allows for more complicated chemistries to be employed, as well as allowing for easy global distribution. Lu-177 also exhibits chemical properties that allow for binding to many bio molecules, for use in a wide variety of medical treatments.

There are two main production pathways to produce Lu-177. One is via a neutron capture reaction on Lu-176; Lu-176 (n,γ) Lu-177. This production method is referred to as carrier added (ca) Lu-177. A carrier is an isotope(s) of the same element (Lu-176 in this case), or similar element, in the same chemical form as the isotope of interest. In microchemistry the chemical element or isotope of interest does not chemically behave as expected due to extremely low concentrations. In addition to this, isotopes of the same element cannot be chemically separated, and require mass separation techniques. The carrier method, therefore, results in the produced Lu-177 having limited medical application.

The second production method for Lu-177 is a neutron capture reaction on ytterbium-176 (Yb-176) (Yb-176(n,γ) Yb-177) to produce Yb-177. Yb-177 then rapidly (tin of 1.911 hours) beta-decays into Lu-177. An impurity of Yb-174 is typically present in the Yb-176, leading to a further impurity of Lu-175 in the final product. This process is considered to be a "no carrier added" process. The process may be carried out as ytterbium metal or ytterbium oxide.

The present disclosure describes a process for the separation of Yb and Lu obtained from a no carrier added process. The process includes a distillation/sublimation process to purify the lutetium and remove excess Yb after irradiation.

The separation of Yb and Lu may, at least partially, take advantage of the difference in their vapor pressure at a particular temperature and pressure. As an example, the boiling point of Yb is 1196° C., while that of Lu is 3402° C. at standard temperature and pressure. The difference in vapor pressures at a specified temperature and pressure can be used to separate Yb and Lu via sublimation and/or distillation. FIG. 1 is a T-x-y diagram for lutetium and ytterbium at a constant pressure of 1 µTorr. In the figure, the lower line (i.e. bubble point) represents the condensed phase composition at a given temperature, while the upper line (i.e.

dew) represents the vapor phase. The graph was prepared using the Ideal gas and Ideal solution assumptions, which are valid in view of the low pressure, high temperature, and chemical similarity of the two components.

In sublimation, the solid phase of an element is converted directly to the gas phase via heating, and the gas phase can then be collected for later use. In distillation, the solid is heated to its boiling point (going through the liquid phase) and vaporized off. The vaporized fraction can then be recovered downstream after the vapor is condensed. In this case, the ytterbium is vaporized (and it may be collected downstream for later use) leaving behind a material that is enriched in lutetium. This may be conducted on larger scale, therefore increasing the amount of lutetium available. It is noted that the Yb that is collected is available for recycling to the reactor to produce further Lu in subsequent runs of the process.

Figure 2:
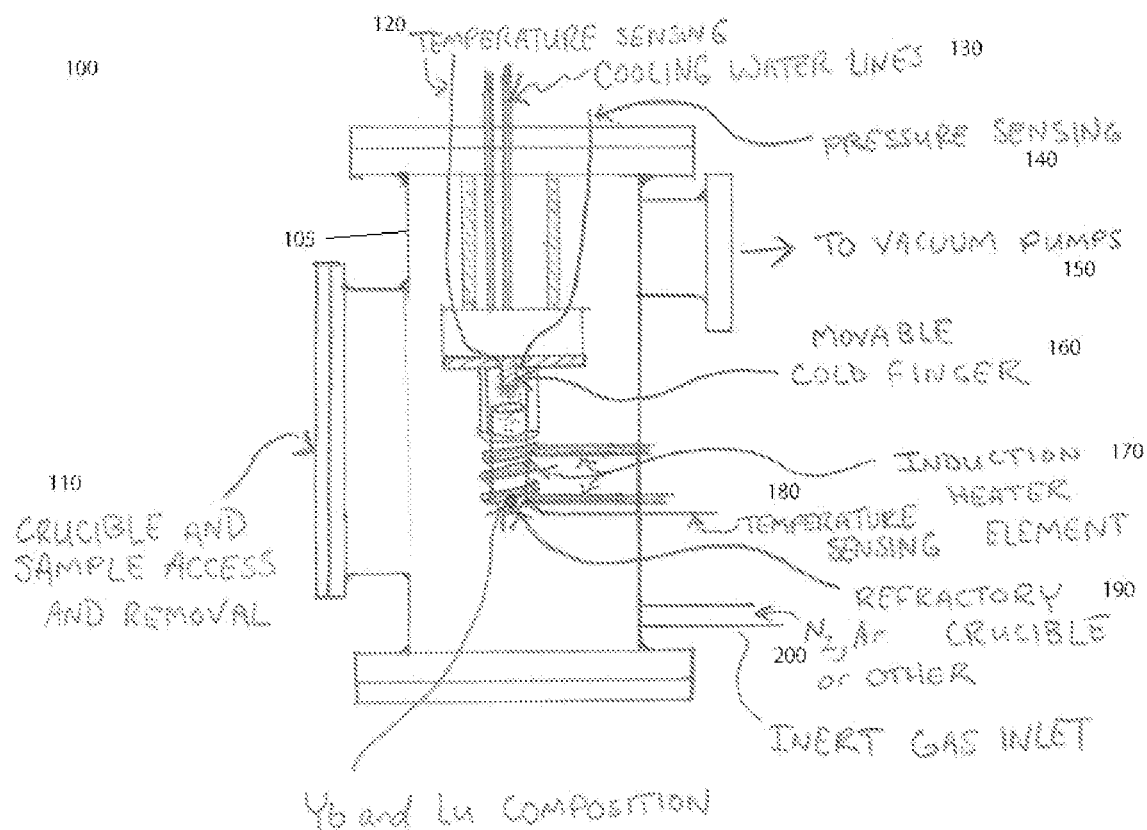
FIG. 2 is an illustration of chamber for distillation/sublimation of the ytterbium and lutetium.

The distillation/sublimation apparatus generally includes a high vacuum chamber with appropriate gas, cooling, vacuum, power and instrument feedthroughs. Referring to FIG. 2, the apparatus 100 has an appropriate volume to contain a refractory crucible 190 suspended or supported within an RF induction heating coil 170, and a cold-finger 160 with collection substrate. The cold finger (cooling rod) 160 with an appropriate end effector is disposed directly above the crucible 190 and is capable of movement which allows the open end of the crucible to be open to the vacuum system or sealed against the collection substrate. The apparatus has appropriate instrumentation to monitor the vacuum pressure of the chamber 140, the temperature of the crucible 180, and the temperature of the cold plate 120. The apparatus 100 is housed within a chamber 105 having an access port 110 to the crucible. The apparatus 100 also includes a vacuum pump connection 150 and at least one port 200 for inert gas introduction.

Generally, the process of the initial purification by distillation and/or sublimation proceeds as follows. An enriched Yb-176 metal target is packaged into a 1 cm diameter quartz tube with sealed ends. The quartz tube is then sealed in an inert overpack (e.g. aluminum) suitable for irradiation and impervious to water or air ingress. The sealed overpack is placed within the reactor and irradiated for several hours to several days (dependent on flux and batch requirements) to generate Lu-177 within the Yb-176 target. After irradiation, the irradiated Yb metal target is removed within an inert environment and placed inside a refractory metal crucible (e.g. molybdenum or tantalum), and placed in a vacuum chamber where the pressure is reduced. The crucible is then heated by radiofrequency (RF) induction. As the Yb metal sublimates from the heated crucible it is deposited onto the cold finger that is actively cooled for collection. As the sublimation advances, the crucible is heated to a higher temperature. At this stage of the process, the generated lutetium or lutetium oxide, minute quantities of ytterbium or ytterbium oxide, and trace contaminants remain in the crucible. The contents of the crucible, including the lutetium, are then dissolved in an acid to remove them from the crucible and for transfer to a chromatographic separation apparatus.

Accordingly, in a first aspect, a method is provided for purifying lutetium. The method includes providing a solid composition that include lutetium and ytterbium, and subliming or distilling ytterbium from the solid composition at a reduced pressure and at a temperature of about 400° C. to about 3000° C. to leave a lutetium composition comprising a higher weight percentage of lutetium than was present in the solid composition. As noted, the ytterbium that is sublimed/distilled from the solid composition may be recycled as additional target material for irradiation.

According to various embodiments, the temperature for sublimation and/or distillation may be from about 450° C. to about 1500° C., or from about 450° C. to about 1200° C. Also, according to various embodiments, the pressure may be from about $1 \times 10^{-8}$ to about 1520 torr. In other embodiments, the temperature may be from about 450° C. to about 1500° C. and the pressure from about 2000 torr to about $1 \times 10^{-8}$ torr; or the temperature may be from about 450° C. to about 1200° C., and the pressure about 1000 torr to about $1 \times 10^{-8}$ torr. In some embodiments, the separation includes distillation of the ytterbium from the solid composition, where the pressure may be from about 1 torr to about $1 \times 10^{-6}$ torr and the temperature about 450° C. to about 800° C. In some embodiments, the separation includes distillation of the ytterbium from the solid composition, where the pressure may be from about $1 \times 10^{-3}$ torr to about 1000 torr and the temperature about 600° C. to about 1500° C. In some embodiments, the separation includes distillation of the ytterbium from the solid composition, where the pressure may be from about $1 \times 10^{-6}$ torr to about $1 \times 10^{-1}$ torr and the temperature about 470° C. to about 630° C.

In some embodiments, a temperature ramp rate may be employed to avoid blistering or uneven heating of the subject Yb sample containing the lutetium, and to evaporate and remove other contaminates within the subject Yb sample. In some embodiments, temperature ramp rates over a period of 10 minutes to 2 hours may be employed to ensure no blistering or uneven heating of the subject Yb sample containing the lutetium. The temperature of the sample may be monitored indirectly through the crucible. In other embodiments, prior to heating of the crucible a vacuum is established to degas the sample. This vacuum may be about $1 \times 10^{-6}$ torr for approximately 5 minutes to 1 hour. A turbomolecular pump may be used to achieve high vacuum levels.

The time period required for the subliming and/or distilling steps may vary widely and is dependent upon the amount of material in the sample, the temperature, and the pressure. It may vary from about 1 second to about 1 week. In some embodiments, it is a rate of sublimation or distillation that is pertinent to the question of time. It may, in some embodiments, be at a rate of about 1 min/g (minute/gram) to about 10 hr/g (hours/gram) of solid composition, or about about 10 min/g to about 100 min/g of solid composition, or about 20 min/g to about 60 min/g of solid composition. In one embodiment, the rate may be about 40 min/g of solid composition.

The sublimation/distillation process yields a sample ("the lutetium composition") that is enriched in lutetium as compared to the solid composition that enters the process. The yields and purity may be measured in a number of ways. For example, in some embodiments, the process yields an ytterbium mass reduction of the solid composition from 10:1 to 10,000:1. In other words, after the sublimation/distillation is completed, there is 10 to 10,000 times less ytterbium in the sample than prior to the process. In the lutetium composition that is recovered (i.e. the contents in the crucible that is subjected to the acid dissolution), there may, in some embodiments, be about 1 wt % to 99.9 wt % of ytterbium relative to total remaining mass. In some further embodiments, there may be about 1 wt % to 90 wt % of ytterbium relative to total remaining mass. In other embodiments, the ytterbium that is collected from the sublimation/distillation is collected in an amount that is about 90 wt % to about 99.999 wt % of the ytterbium present in the solid composition. The purification steps are also conducted to remove other trace metals and contaminants. For example, materials such as metals, metal oxides, or metal ions of K, Na, Ca, Fe, Al, Si, Ni, Cu, Pb, La, Ce, Lu (non-radioactive), Eu, Sn, Er, and Tm may be removed. Stated another way, a method includes subjecting a sample comprising Yb-176 and Lu-177 to sublimation, distillation, or a combination thereof to remove at least a portion of the Yb-176 from the sample and form a Lu-177-enriched sample.

It has been observed that a purification of greater than 1000:1 reduction (i.e. a 1000 times reduction in the amount of Yb present) in Yb may be achieved. This includes greater than approximately 3000:1, greater than 8000:1, greater than 10,000:1, up to and including approximately 40,000:1. However, higher reductions in Yb may be required to meet purity requirements for some pharmaceutical products. Accordingly, additional purification may be conducted prior to use in pharmaceutical applications.

The present invention, thus generally described, will be understood more readily by reference to the following examples, which are provided by way of illustration and are not intended to be limiting of the present invention.

EXAMPLES

General. Description of the sublimation/distillation apparatus. The apparatus includes a high vacuum chamber with appropriate gas, cooling, vacuum, power, and instrument feedthroughs. The apparatus has an appropriate volume to contain a refractory crucible suspended or supported within an RF induction heating coil, and a cold-surface with collection substrate. A cold finger (cooling rod) with an appropriate end effector is disposed directly above the crucible and is capable of movement which allows the open end of the crucible to be open to the vacuum system or sealed against the collection substrate. The apparatus has appropriate instrumentation to monitor the vacuum pressure of the chamber, the temperature of the crucible, and the temperature of the cold plate.

Description of the process of sublimation/distillation.

1. Enriched Yb-176 metal is packaged into a 1 cm diameter quartz vial with sealed ends, either evacuated or containing inert gas.
2. The quartz vial is sealed in an inert overpack (i.e. aluminum) suitable for irradiation and impervious to water or air ingress.
3. The sealed overpack is placed within the reactor and irradiated for several hours to several days (dependent on flux and batch requirements).
4. The overpack is removed from the reactor.
5. The transport cask is loaded into the processing hotcell or isolator.
6. The quartz vial with irradiated metal is opened, and the irradiated Yb metal target removed.
7. The irradiated Yb metal target is placed inside a refractory metal crucible (e.g. molybdenum or tantalum).
8. Under an inert atmosphere (e.g. He, $N_2$, Ar, etc.), the chamber is evacuated until a stable pressure of approximately $1 \times 10^{-6}$ torr is obtained.
9. The crucible is then heated by radiofrequency (RF) induction heating to approximately 470° C. At this temperature, the direct sublimation of Yb is indicated by a slight pressure rise within the vacuum chamber due to engineered leak paths for small amounts of Yb vapor. As the Yb metal sublimates from the heated crucible it is selectively deposited on to a cold finger which is actively cooled for collection and re-use at step 1.
10. Sublimation is allowed to continue for approximately 40 minutes per gram of starting material, and completion of the process is identified by an abrupt drop in vacuum pressure from about $5 \times 10^{-6}$ torr to less than about $1 \times 10^{-6}$ torr.
11. Following completion of sublimation, the crucible is heated further, to approximately 600° C. for 10 minutes. At this stage, only minute quantities of lutetium, minute quantities of ytterbium oxide, and trace contaminants remain in the crucible.
12. Dilute HCl (approximately 2 ml of approximately 2 M) is then added to the crucible to dissolve the remaining material, which is then removed by pipet or syringe and filtered with a 0.22 μm membrane.

Example 1. Illustrative example of the process. A quartz vial is loaded with $^{176}$Yb metal (10 g) and irradiated for 6 days thereby converting some of the $^{176}$Yb to $^{177}$Lu. The mixed $^{176}$Yb/$^{177}$Lu sample is then transferred to a crucible and loaded into a vacuum chamber. The crucible is then heated to 650° C., at an external pressure of 1e-6 torr, for approximately 24 hours, during which time a portion of the $^{176}$Yb sublimes within the crucible onto a cold finger within the vacuum chamber and the $^{177}$Lu remains in the crucible. The $^{176}$Yb may then be recycled for further irradiation.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method for purifying lutetium, the method comprising:
    subliming or distilling ytterbium from a solid composition in an inert or reduced pressure environment and at a temperature of about 400° C. to about 3000° C. to leave a lutetium composition comprising a higher weight percentage of lutetium than was present in the solid composition.
2. The method of claim 1, wherein the temperature is about 450° C. to about 1500° C.
3. The method of claim 1, wherein the temperature is about 450° C. to about 1200° C.
4. The method of claim 1, further comprising collecting the ytterbium for reuse.
5. The method of claim 4, wherein the ytterbium is collected in an amount that is about 90 wt % to about 99.999 wt % of the ytterbium present in the solid composition.
6. The method of claim 1, wherein the reduced pressure is about $1 \times 10^{-8}$ to about 2000 torr.
7. The method of claim 1, wherein the temperature is about 450° C. to about 1500° C., and the reduced pressure is about 2000 torr to about $1 \times 10^{-8}$ torr.
8. The method of claim 1, wherein the temperature is about 450° C. to about 1200° C., and the reduced pressure is about 1000 torr to about $1 \times 10^{-8}$ torr.
9. The method of claim 1, wherein the reduced pressure is about 100 torr to about $1 \times 10^{-7}$ torr.
10. The method of claim 1, comprising subliming the ytterbium, wherein the reduced pressure is about 10 torr to about $1 \times 10^{-6}$ torr and the temperature is about 450° C. to about 800° C.
11. The method of claim 1, comprising distilling the ytterbium, wherein the reduced pressure is about $1 \times 10^{-3}$ torr to about 2000 torr and the temperature is about 600° C. to about 1500° C.
12. The method of claim 1, wherein the subliming or distilling is conducted for a period of about 1 second to about 1 week.
13. The method of claim 1, wherein the subliming or distilling is conducted at a rate of about 10 min/g to about 100 min/g of solid composition.
14. The method of claim 13, wherein the subliming or distilling is conducted at a rate of about 20 min/g to about 60 min/g of solid composition.
15. The method of claim 14, wherein the subliming or distilling is conducted at a rate of about 40 min/g of solid composition.
16. The method of claim 1, wherein the process yields a ytterbium mass reduction of the solid composition from 1000:1 to 10,000:1.
17. The method of claim 1, wherein the lutetium composition comprises about 1 wt % to 90 wt % of ytterbium.
18. The method of claim 1, wherein the solid composition further comprises metals, oxides, or ions of K, Na, Ca, Fe, Al, Si, Ni, Cu, Pb, La, Ce, Lu (non-radioactive), Eu, Sn, Er, and Tm.
19. The method of claim 1, wherein the ytterbium comprises Yb-176 and the lutetium comprises Lu-177.
20. The method of claim 1, wherein the providing comprises reducing ytterbium oxide to ytterbium metal, and irradiating the ytterbium metal to generate lutetium.
21. The method of claim 1, wherein the ytterbium is Yb-176 and the lutetium is Lu-177, and a neutron capture reaction with Yb-176 forms the composition comprising solid Yb-176, solid Yb-177, and solid Lu-177.
22. The method of claim 21, further comprising prior to subliming, contacting a solid comprising Yb-176 with a neutron source to convert at least a portion of the Yb-176 to Lu-177 to form the solid composition.
23. The method of claim 1, wherein the temperature is about 400° C. to less than 700° C. and the reduced pressure is $1 \times 10^{-5}$ torr or less.
24. The method of claim 23, wherein the reduced pressure is $1 \times 10^{-6}$ torr or less.
25. The method of claim 1, wherein the temperature is about 400° C. to about 650° C.
26. The method of claim 1, wherein the temperature is about 450° C. to about 650° C.
27. The method of claim 1, wherein the temperature is about 470° C. to about 630° C.
28. The method of claim 1, wherein the temperature is greater than 800° C. to about 3000° C.
29. The method of claim 1, wherein the temperature is about 1000° C. to about 3000° C.
30. The method of claim 1, wherein the temperature is about 1200° C. to about 3000° C.
31. The method of claim 1, wherein the temperature is about 1500° C. to about 3000° C.
32. The method of claim 1, wherein the solid composition is contained in a crucible of a sublimation/distillation apparatus and subliming or distilling ytterbium from the solid composition comprises heating the crucible such that the ytterbium sublimes, distills, or both sublimes and distills from the solid composition and collects on a collection substrate of the sublimation/distillation apparatus.
33. The method of claim 32, wherein the subliming or distilling comprises establishing the reduced pressure environment, thereby degassing the crucible of the sublimation/distillation apparatus, and thereafter heating the solid composition to the temperature of about 400° C. to about 3000° C.

34. The method of claim 32, wherein the collection substrate is movable to selectively seal the collection substrate onto the crucible.

35. The method of claim 34, wherein a cool finger extends from the collection substrate toward the crucible such that the cool finger extends into the crucible when the collection substrate is sealed onto the crucible.

36. The method of claim 32, wherein the collection substrate is actively cooled when subliming or distilling ytterbium from the solid composition such that the ytterbium collects on the collection substrate.

37. The method of claim 32, wherein a cool finger extends from the collection substrate toward the crucible and the cool finger is actively cooled when subliming or distilling ytterbium from the solid composition such that the ytterbium collects on the cool finger.

38. The method of claim 1, wherein the inert or reduced pressure environment comprises an inert environment.

39. A method comprising:
heating a solid composition of ytterbium and lutetium to a first temperature in an inert or reduced pressure environment;
retaining the solid composition at the first temperature in the inert or reduced pressure environment such that ytterbium sublimes, distills, or both sublimes and distills from the solid composition; and
heating the solid composition to a second temperature that is greater than the first temperature in the inert or reduced pressure environment such that a lutetium composition comprising a higher weight percentage of lutetium than was present in the solid composition remains, wherein the first temperature and the second temperature are both within a range of about 400° C. to about 3000° C.

40. The method of claim 39, wherein the reduced pressure is $1\times10^{-5}$ torr or less and the first temperature is about 400° C. to less than 700° C.

41. The method of claim 40, wherein the reduced pressure is $1\times10^{-6}$ torr or less.

42. The method of claim 39, wherein the first temperature and the second temperature are both within a range of about 400° C. to about 650° C.

43. The method of claim 39, wherein the inert or reduced pressure environment comprises an inert environment.

* * * * *